United States Patent
Lo et al.

(10) Patent No.: US 9,977,612 B1
(45) Date of Patent: May 22, 2018

(54) SYSTEM DATA MANAGEMENT USING GARBAGE COLLECTION AND LOGS

(75) Inventors: Jerry Lo, Hacienda Heights, CA (US);
Dominic S. Suryabudi, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 54 days.

(21) Appl. No.: 13/470,206

(22) Filed: May 11, 2012

(51) Int. Cl.
*G06F 3/06* (2006.01)

(52) U.S. Cl.
CPC .......... *G06F 3/0619* (2013.01); *G06F 3/0656* (2013.01); *G06F 3/0688* (2013.01)

(58) Field of Classification Search
CPC ................................................ G06F 17/30191
See application file for complete search history.

(56) References Cited

U.S. PATENT DOCUMENTS

| | | | |
|---|---|---|---|
| 5,835,955 A | 11/1998 | Dornier et al. | |
| 6,615,223 B1 * | 9/2003 | Shih et al. | 707/625 |
| 6,728,826 B2 | 4/2004 | Kaki et al. | |
| 6,856,556 B1 | 2/2005 | Hajeck | |
| 7,126,857 B2 | 10/2006 | Hajeck | |
| 7,212,440 B2 | 5/2007 | Gorobets | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,502,259 B2 | 3/2009 | Gorobets | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,702,868 B1 | 4/2010 | Hardman | |
| 7,711,923 B2 | 5/2010 | Rogers et al. | |
| 7,733,712 B1 | 6/2010 | Walston et al. | |
| 7,765,373 B1 | 7/2010 | Merry et al. | |

(Continued)

OTHER PUBLICATIONS

U.S. Appl. No. 13/478,036, filed May 22, 2012, to Lo, et al., 22 pages.

*Primary Examiner* — Ann J Lo
*Assistant Examiner* — Leandro R Villanueva
(74) *Attorney, Agent, or Firm* — McDermott Will & Emery LLP

(57) ABSTRACT

A data storage system is disclosed that utilizes garbage collection and logs for managing system data. In one embodiment, system data stored in a non-volatile memory is updated based on the character of changes to data stored in a data storage system (e.g., changes caused by host system activity). For example, when changes to stored data are scattered (e.g., changes are made to random memory locations), it may be beneficial to generate and accumulate more logs reflecting changes to the system data. As another example, when changes to stored data are substantially consolidated (e.g., changes are made to consecutive memory locations), it may be beneficial to update system data stored in the non-volatile memory more frequently. Reduction in write amplification, increase in efficiency, and reduction in start-up and initialization time can be attained. Reconstruction time of system data can also be reduced.

28 Claims, 6 Drawing Sheets

(56) References Cited

U.S. PATENT DOCUMENTS

| | | |
|---|---|---|
| 7,898,855 B2 | 3/2011 | Merry, Jr. et al. |
| 7,912,991 B1 | 3/2011 | Merry et al. |
| 7,913,061 B2 | 3/2011 | Gorobets et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,194,340 B1 | 6/2012 | Boyle et al. |
| 8,194,341 B1 | 6/2012 | Boyle |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,582,223 B1 | 11/2013 | Garani et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,966,205 B1 | 2/2015 | Lo et al. |
| 8,984,247 B1 | 3/2015 | Lo et al. |
| 2002/0184436 A1 | 12/2002 | Kim et al. |
| 2003/0065899 A1 | 4/2003 | Gorobets |
| 2004/0210706 A1 | 10/2004 | In et al. |
| 2005/0166028 A1 | 7/2005 | Chung et al. |
| 2008/0082775 A1* | 4/2008 | Gorobets ............... 711/170 |
| 2008/0098195 A1 | 4/2008 | Cheon et al. |
| 2009/0150599 A1 | 6/2009 | Bennett |
| 2010/0106897 A1 | 4/2010 | Yoshimura |
| 2010/0174849 A1 | 7/2010 | Walston et al. |
| 2010/0180068 A1 | 7/2010 | Matsumoto et al. |
| 2010/0250793 A1 | 9/2010 | Syu |
| 2010/0262799 A1 | 10/2010 | Lasser et al. |
| 2011/0029720 A1 | 2/2011 | Lu |
| 2011/0099323 A1 | 4/2011 | Syu |
| 2011/0161621 A1 | 6/2011 | Sinclair et al. |
| 2011/0173395 A1* | 7/2011 | Bhattacharjee et al. ...... 711/135 |
| 2011/0283049 A1 | 11/2011 | Kang et al. |
| 2011/0296123 A1* | 12/2011 | Adler et al. ............. 711/156 |
| 2011/0307651 A1 | 12/2011 | Wong |
| 2012/0110258 A1* | 5/2012 | Lakey et al. ............ 711/113 |
| 2012/0239860 A1* | 9/2012 | Atkisson et al. ......... 711/103 |
| 2012/0260020 A1 | 10/2012 | Suryabudi et al. |
| 2012/0265924 A1* | 10/2012 | Purdy et al. ............. 711/103 |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0166819 A1 | 6/2013 | Yerushalmi et al. |
| 2013/0185508 A1 | 7/2013 | Talagala et al. |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2016/0048352 A1 | 2/2016 | Lo et al. |

\* cited by examiner

SYSTEM DATA MANAGEMENT USING GARBAGE COLLECTION AND LOGS

BACKGROUND

Technical Field

This disclosure relates to data storage systems, such as non-volatile data storage systems, for computer systems. More particularly, the disclosure relates to managing system data using garbage collection and logs.

Description of the Related Art

Data storage systems can utilize various types of system data, such as logical to physical address mapping data, which associates logical addresses used by a host system for accessing stored data with corresponding physical locations in a data storage system where data is stored. Due to updates of data stored in the data storage system, certain stored data may become outdated, thereby causing entries in the mapping table corresponding to such outdated data to become invalid. In such circumstances, the data storage system can generate updated mapping table entries. However, various problems arise with maintenance of system data, such as increased write amplification associated with storing system data, compromised coherency, and the like. Accordingly, it is desirable to provide mechanisms that efficiently handle maintenance of system data.

BRIEF DESCRIPTION OF THE DRAWINGS

Systems and methods that embody the various features of the invention will now be described with reference to the following drawings, in which:

FIGS. 2A-2C illustrate storage layout of system data and logs according to some embodiments of the invention.

DETAILED DESCRIPTION

Figure 1:
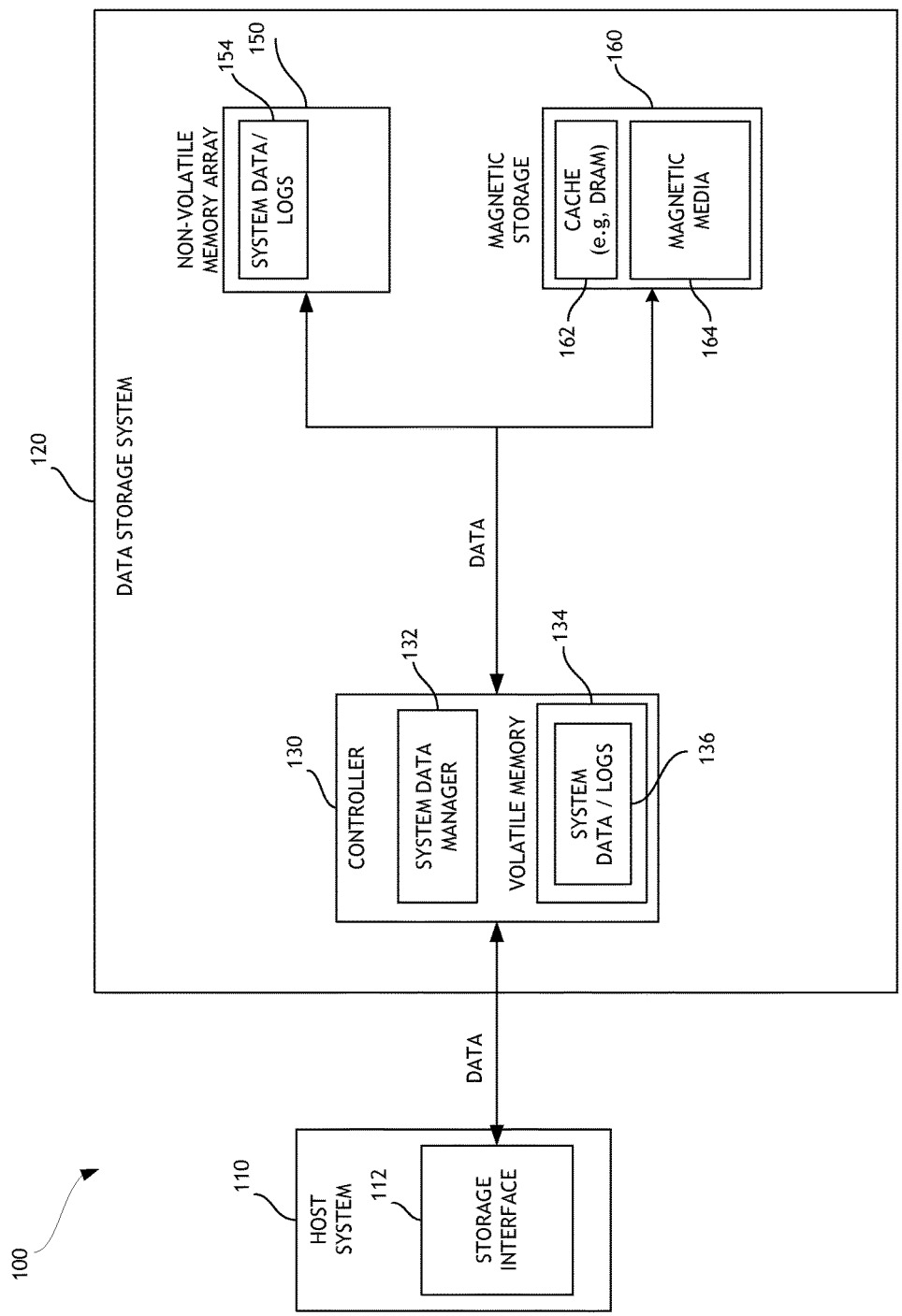
FIG. 1 illustrates a combination of a host system and a data storage system that implements garbage collection and logs according to an embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems can utilize various types of system data, including logical to physical address mapping data, superblock data, invalid page data, invalid counter data, wear level data, and so on. Logical to physical address mapping table can comprise information associating logical addresses used by a host system to store data in a data storage system and/or access stored data with physical locations in the data storage system where data is stored. Superblock table can comprise information concerning logical groupings of non-volatile memory blocks into superblocks. Superblocks can be utilized to achieve parallel or concurrent execution of multiple storage access operations. In one embodiment, each block in a superblock can be on one die of a group of non-volatile memory dies. Other configurations are possible in other embodiments. For example, a superblock can be comprised of blocks from various planes in a group of dies. In another embodiment, multiple blocks within a superblock may be on the same die/plane. Invalid page table can comprise information concerning locations of non-volatile memory pages that are defective or unreliable (e.g., those pages where data should not be stored). Invalid counter table can comprise information corresponding to the associations of invalid pages with particular superblocks. Wear level table can comprise erase counts for non-volatile memory locations (e.g., partial pages, pages, blocks, groups of blocks, etc.).

In operation, a copy of such system data (e.g., a logical to physical address mapping table) may be stored in a volatile memory such as DRAM and the copy can be used to track changes to the data storage system. This volatile copy of the system data (e.g., copy of the system data stored in the volatile memory) is reconstructed at power-up, and to ensure power-safety, the data storage system needs to maintain sufficient information in the non-volatile memory to enable a complete and accurate reconstruction. Thus, embodiments of the present invention are directed to efficiently updating the non-volatile copy of the system data (e.g., copy of the system data stored in the non-volatile memory) to ensure data coherency (e.g., to ensure that the volatile and non-volatile copies of the system data are synchronized).

Some embodiments of the present invention generate and update the non-volatile version of the system data quickly and efficiently while reducing write amplification associated with managing of system data. Advantageously, coherency of system data updates is also ensured. In addition, changes to system data (e.g., the non-volatile copy of the system data) can be committed atomically (e.g., together or at same or substantially same time) even in cases when sections or parts of system data being updated are stored in different memory regions. Further, start-up performance (e.g., start-up time) of the data storage system is improved because reconstruction time of system data is reduced. In addition, segmenting of system data (e.g., storing and loading segments of system data) is allowed, and efficiency of loading segments of system data is increased.

In some embodiments of the present invention, system data stored in the volatile memory (e.g., logical to physical address mapping table) is updated based on changes to data stored in a data storage system (e.g., changes as a result of host system activity). Logs are used to track changes to the mapping table in volatile memory and such logs are periodically saved to the non-volatile memory. The version or copy of the mapping table stored in the non-volatile memory is generally updated at a later time with the information in saved logs. When changes to stored data are scattered (e.g., changes are made to random memory locations), it may be beneficial to generate and accumulate more logs reflecting changes needed to be made to the copy of the system data stored in the non-volatile memory. As another example, when changes to stored data are substantially consolidated (e.g., changes are made to consecutive memory locations), it may be beneficial to update the copy of the system data stored in the non-volatile memory more frequently. Basing changes on the activity of a host system can reduce write amplification associated with updating system data in the non-volatile memory.

In some embodiments of the present invention, executing storage access commands received from a host system (or generated internally) can cause the copy of the system data stored in the non-volatile memory array to become outdated. Logs reflecting or recording changes to the system data in the non-volatile memory can be selectively generated and used to update the copy of the system data in the non-volatile memory. In response to determining that the execution of storage access commands causes related system data in the non-volatile memory to become outdated, system data in the non-volatile memory can be updated at a first update frequency so that at least some system data becomes current or up-to-date. In response to determining that the execution of the storage access commands does not cause related system data in the non-volatile memory to become outdated, system data in the non-volatile memory can be updated at a second update frequency. The first update frequency can be different (e.g., lower) than the second update frequency. No logs may be generated when it is determined that the execution of the storage access commands causes related system data to become outdated.

In some embodiments of the present invention, changes to the system data can be consolidated before updating the system data. For example, a number of log pages can be generated before committing changes reflected by the log pages to the non-volatile copy of the system data. In some embodiments, changes reflected in the log pages can be consolidated into new log pages. Write amplification can be reduced if two or more log pages reflect updates to the same system data region (e.g., same non-volatile memory page where system data is stored). Reconstruction time of system data can be reduced.

In some embodiments of the present invention, in response to determining that a number of generated logs exceeds a threshold, system data stored in the non-volatile memory can be updated based on the generated logs. After changes reflected in the logs have been applied or committed to the non-volatile copy of the system data, logs can be garbage collected. In some embodiments, the non-volatile copy of the system data is updated based on changes recorded in a set of logs that have been generated before other logs.

In some embodiments of the present invention, changes to the system data stored in the volatile memory are recorded in logs. Non-volatile copy of the system data can be updated after a log has been generated. This can improve performance and/or reduce write amplification by making updates to the non-volatile copy of the system data as recorded in a log at the same time or at substantially same time. Further, the volatile copy of the system data can be quickly reconstructed by making the updates recorded in the log that was generated last. After changes reflected in the log have been applied to system data, the log can be garbage collected.

System Overview

FIG. 1 illustrates a combination 100 of a host system and a data storage system that implements garbage collection and logs according to an embodiment of the invention. As is shown, the data storage system 120 (e.g., a hard disk drive, hybrid disk drive, solid-state drive, etc.) includes a controller 130 and a non-volatile memory array 150, which can store host data, system data and/or logs 154, and other types of data. The non-volatile memory array 150 comprises non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In some embodiments, non-volatile memory array 150 can be partitioned into dies, planes, channels, blocks, pages, and so on. In certain embodiments, a non-volatile memory page (e.g., NAND page) can refer to a smallest grouping of memory cells (or smallest granularity) that can be programmed or written in a single operation or as a unit (e.g., atomically). In some embodiments, the data storage system 120 can also comprise other types of storage, such as one or more magnetic storage modules 160, which can comprise volatile cache (e.g., DRAM) 162 and non-volatile magnetic media 164.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., LBA) used to access the data storage system 120. The controller 130 can execute the received commands in the non-volatile memory array 150 and/or other storage modules, such as magnetic storage 160.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory array 150 and/or other storage modules. Such mapping can be performed using a logical to physical address mapping table.

The controller 130 includes a system data manager module 132 for generating, maintaining, updating, storing, etc. various types of system data. Such system data can include one or more of the following: logical to physical address mapping data, superblock data, invalid page data, invalid counter data, wear level data, and so on. Although logical to physical address mapping table system data example is used in some parts of this disclosure, approaches disclosed herein are applicable to other types of system data organized as tables or using other suitable data structures.

The controller 130 also includes volatile memory 134 where various types of data can be stored, such as system data and/or logs 136. It may be advantageous to store a working copy of the system data in the volatile memory 134 for faster access (e.g., particularly data that is frequently used by the controller 130 and/or the data storage system 120). In some embodiments, volatile memory 134 can be located outside the controller 130. A back-up copy of the system data can be stored in the non-volatile memory array 150.

Garbage Collection and Logs

Figures 2A, 2B:
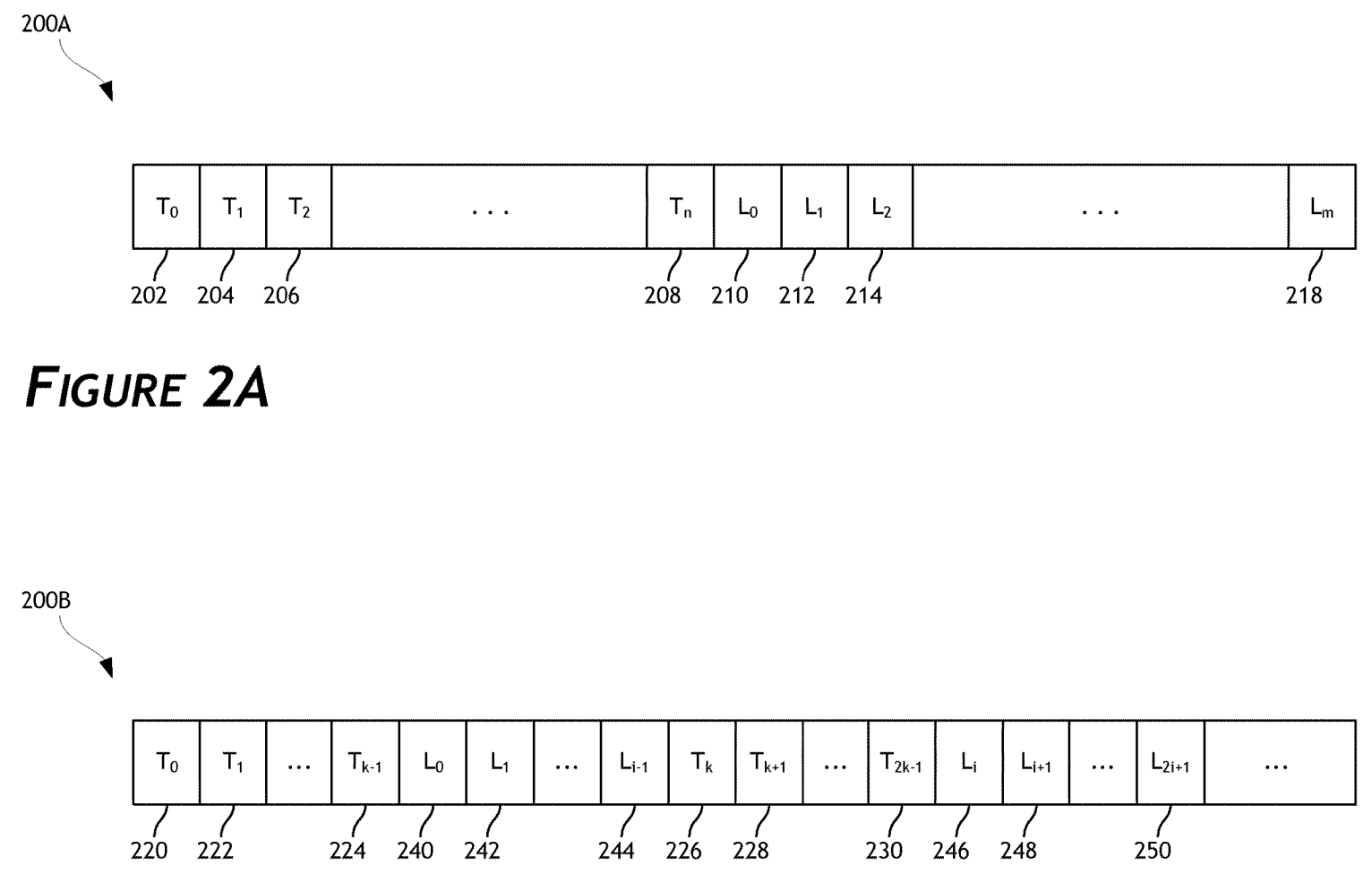
Figure 2C:
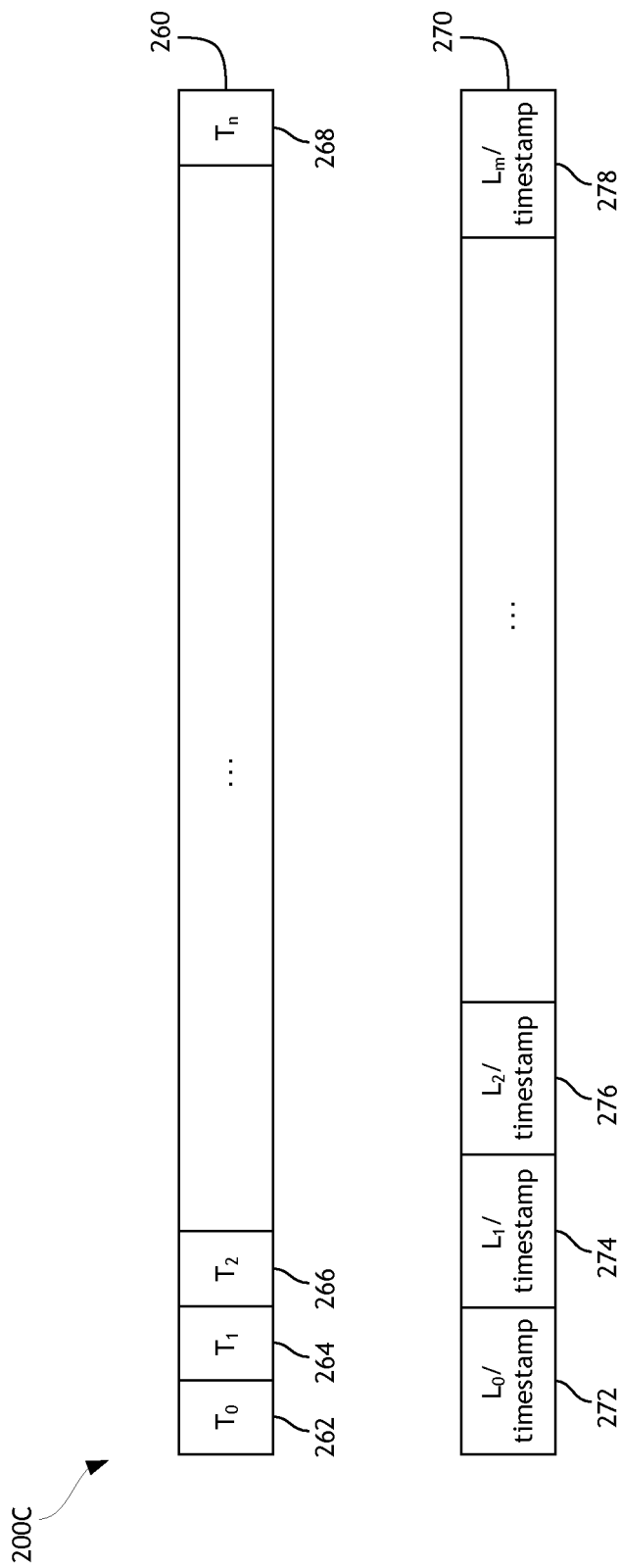

FIGS. 2A-2C illustrate storage layout of system data and logs according to some embodiments of the invention. The figures illustrate how system data, such as logical to physical address mapping table, and logs can be stored in memory. Storing of system data can be performed by the controller 130 and/or system data manager 132. With reference to FIG. 2A, a portion of system data 200A, such as logical to physical address mapping table, is shown. System data 200A can be stored in the non-volatile memory array 150 and/or in volatile memory 134. System data 200A can be partitioned and stored in pages $T_o$ (202), $T_1$ (204), $T_2$ (206) through $T_n$ (208), and updates to the system data can be stored in log pages $L_o$ (210), $L_1$ (212), $L_2$ (214) through $T_m$ (218). Table pages can comprise mappings or associations between logical and physical addresses in the data storage system 120, such as associations between logical chunk numbers (LCNs) and physical chunk number (PCNs), associations between logical block addresses (LBAs) and PCNs, and the like. In some embodiments, a "table page" and/or "log page" refers to a quantity of mapping table data that fits into a page of non-volatile memory. Log pages can reflect changes to the copy of the system data stored in the volatile memory 134 (e.g., changes cause by execution of storage access commands received from the host system 110). As is depicted, log pages can be stored in memory (e.g., non-volatile memory array 150) following table pages. Changes reflected by logs stored later in memory can correspond to more recent changes to the volatile copy of the system data than those reflect by the earlier stored logs.

FIG. 2B depicts a portion of system data 200B, such as logical to physical address mapping table. System data 200B can be stored in the non-volatile memory array 150 and/or in volatile memory 134. System data 200B can be partitioned and stored in pages $T_o$ (220), $T_1$ (222) through $T_{k-1}$ (224) and $T_k$ (226), $T_{k+1}$ (228) through $T_{2k-1}$ (230). Log pages $L_o$ (240), $L_1$ (242) through $L_{i-1}$ (244) and $L_i$ (246), $L_{i+1}$ (248) through $L_{2i+1}$ (250) can reflect or represent changes to the copy of the mapping table stored in the volatile memory 134 (e.g., changes caused by executing storage access commands received from the host system 110). As is depicted, log pages can be interleaved (or stored serially) in memory (e.g., non-volatile memory array 150) with table pages. This approach can be beneficial for synchronizing the non-volatile copy of the mapping table with the logs. For example, log that have been stored earlier can reflect changes to the volatile copy of the mapping table that are less recent than changes reflected by logs that have been stored later.

FIG. 2C depicts a portion of system data 200C, such as logical to physical address mapping table. System data 200C can be stored in the non-volatile memory array 150 and/or in volatile memory 134. System data 200B can be partitioned and stored in a memory region 260 (e.g., a non-volatile memory superblock) that comprises table pages $T_o$ (262), $T_1$ (264), $T_2$ (226) through $T_n$ (268). Log pages $L_o$ (272), $L_1$ (274), $L_2$ (276) through $L_m$ (278) can reflect or represent changes to the mapping table stored in the volatile memory 134 (e.g., changes caused from executing storage access commands received from the host system 110). As is depicted, log pages can be stored in another memory region 270 (e.g., a non-volatile memory superblock). This approach can be beneficial for synchronizing the non-volatile copy of the mapping table with the logs. To achieve synchronization, logs can be stored with timestamps, which can reflect the time when a particular log was generated. Timestamps can be used for chronologically ordering logs, such as for determining which logs reflect more recent changes to the volatile copy of the system data.

In some embodiments, system data can include more or less table pages may be stored than is depicted in FIGS. 2A-2C. In some embodiments, more or less log pages may be stored than is depicted in FIGS. 2A-2C. In some embodiments, other suitable ways of storing system data and/or logs can be used.

Figure 3:
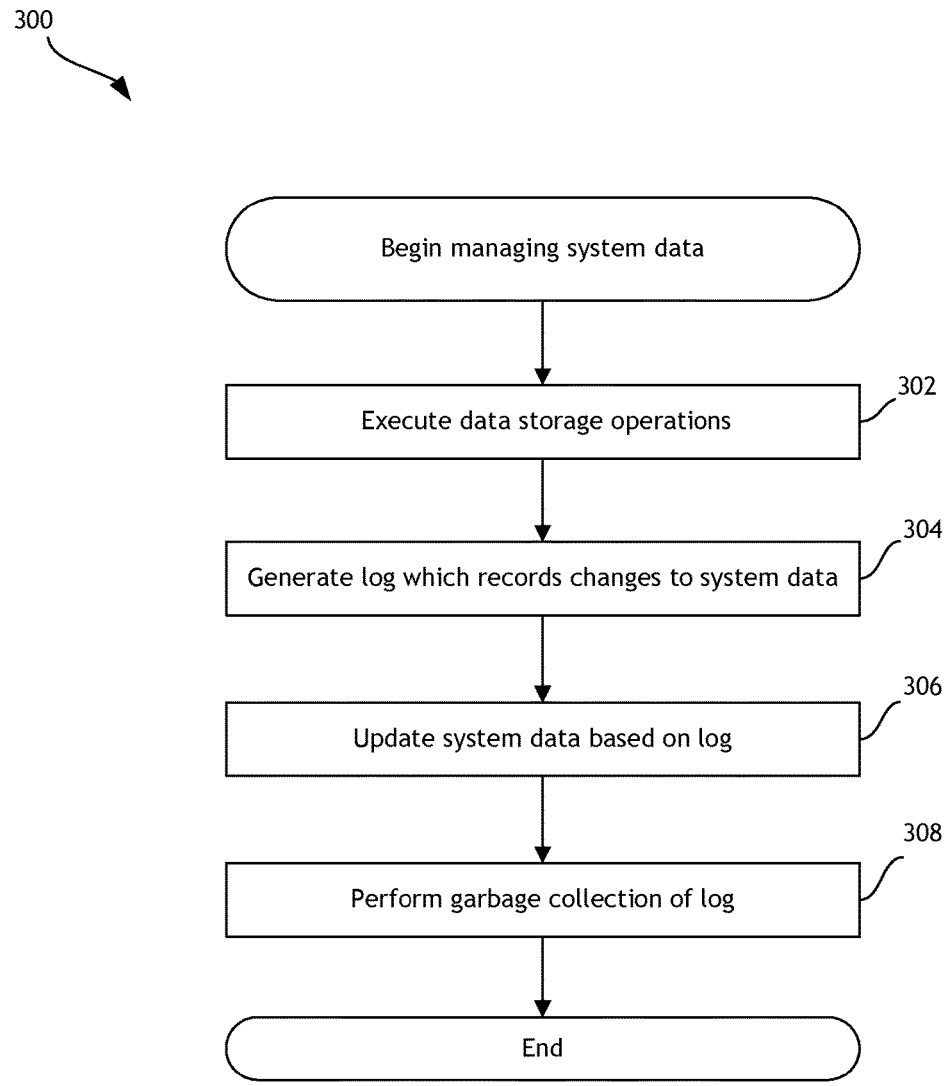
FIG. 3 is a flow diagram illustrating managing system data using garbage collection and logs according to an embodiment of the invention.

FIG. 3 is a flow diagram illustrating a process 300 for managing system data using garbage collection and logs according to an embodiment of the invention. The process 300 can be executed by the controller 130 and/or system data manager 132. In block 302, the process 300 can execute storage access operations received from the host system 110 and/or internally generated by the data storage system 120. Execution of the storage access operations can cause system data stored in the volatile memory 134 to become outdated or invalid. For example, the host system 110 could have communicated a more recent copy or copies of data for storing in the data storage system 120. In one embodiment, because the host system 110 uses logical addresses for accessing (e.g., updating) data stored in the data storage system 120, the details of physical storage of data in the data storage system 120 (e.g., in the non-volatile memory array 150) are abstracted from the host system 110. System data (e.g., logical to physical address mapping table) is used to track the address indirection. In such cases when system data is a logical to physical address mapping table, data storage system 120 may invalidate the existing association between the logical address or addresses corresponding to the physical location or locations where outdated copies of data are stored and create a new association between the logical address or addresses and another physical location or locations where a more recent (or most recent) copies of data are written.

In block 304, the process 300 can generate a log (or logs) that records changes to the volatile copy of the system data caused by the execution of storage access operations. In one embodiment, the process 300 can store the log in the non-volatile memory array 150 (e.g., a non-volatile memory page) so that the log can be maintained in case there is a loss and/or interruption of power, a reboot or restart, etc. of the data storage system 120. In block 306, the process 300 can make updates to the system data stored in the non-volatile memory array based on the changes recorded in the log. In other words, the process 300 can synchronize the volatile and non-volatile copies of the system data. In one embodiment, all changes recorded in the log can be applied to the system data. In another embodiment, changes recorded in the log page can be partially applied to the system data (e.g., some changes can be applied at a certain time and other changes can be applied at a later time). Applying changes based on the log page can reduce write amplification associated with managing of system data and provide coherency because updates to system data may be consolidated. Storing the log persistently (e.g., in non-volatile memory 150) provides power-safety. Further, this can also reduce reconstruction time of the volatile copy of the system data following system restart and/or reduce the start-up time because system data can be updated using information from a limited number of new log pages (such as one new log page). In block 308, the process 300 can perform garbage collection of the log. In other words, the process 300 can mark the log as invalid (or indicate in some other manner that indicates that the log does not contain information that needs to be maintained) so that the log can be overwritten in the future.

Figure 4:
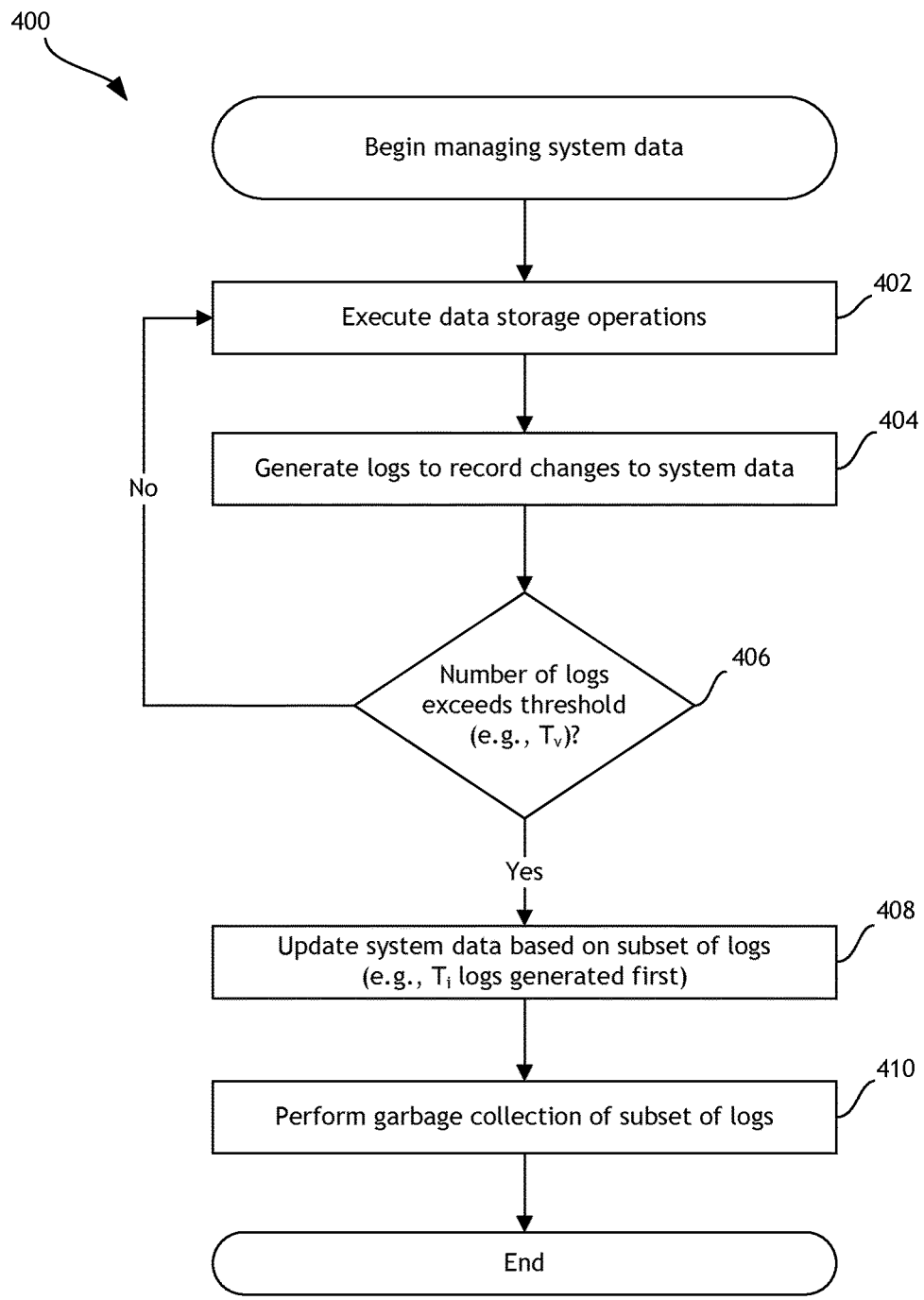
FIG. 4 is a flow diagram illustrating managing system data using garbage collection and logs according to another embodiment of the invention.

FIG. 4 is a flow diagram illustrating a process 400 for managing system data using garbage collection and logs according to an embodiment of the invention. The process 400 can be executed by the controller 130 and/or system data manager 132. In block 402, the process 400 can execute storage access operations received from the host system 110 and/or internally generated by the data storage system 120. As is explained above, execution of the storage access operations can cause stored in the volatile memory 134 system data to become outdated or invalid. In block 404, the process 400 can generate logs that record changes to the system data stored in the non-volatile memory array 150. Logs can be stored persistently in the data storage system 120 (e.g., in non-volatile memory pages). In one embodiment, the process 400 can commit changes to the non-volatile copy of the system data when a certain number of logs have been generated. This number can be a preset number or can be dynamically determined and/or adjusted. Waiting to consolidate updates to system data can reduce write amplification and ensure coherency. For example, the number of updates to system data can be reduced because logs can comprise changes corresponding to the same system data entry, and only the latest changes can be applied.

In block 406, the process 400 can determine whether the number of generated logs reaches or exceeds the threshold. If the number of generated logs does not reach or exceed the threshold, the process 400 returns to block 402. Otherwise, in block 408, the process 400 can update the non-volatile copy of the system data based on the generated logs. In one embodiment, the process 400 can update the non-volatile copy of the system data based on changes recorded in all new logs that have been generated since the last update of system data took place. In another embodiment, the process 400 can update the non-volatile copy of the system data based on a subset of new logs that have been generated since the last update of system data took place. For example, the process 400 can update the non-volatile copy of the system data based on a number of new logs that have been generated first (e.g., since the last update of system data). In other embodiments, the process 400 can select other subsets of logs. After changes recorded in the logs have been applied to the system data, the process 400 can perform garbage collection of those logs, as is depicted in block 410. Garbage collection can be performed in the manner explained above or any other suitable manner.

Time for reconstruction of the volatile copy of the system data and start-up time of the data storage system 120 can thus be reduced. In one embodiment, reconstruction of system data may involve applying changes recorded in those logs that are valid, which can be bounded by a threshold $T_v$ (e.g., 2, 4, 5, 10, 12, 16, 18, and so on) of block 406 and threshold $T_i$ (e.g., 2, 4, 5, 10, 12, 16, 18, and so on) of block 408. That is, changes recorded in at most $T_v$ log pages may need to be applied to system data in order to reconstruct the system data.

Figure 5:
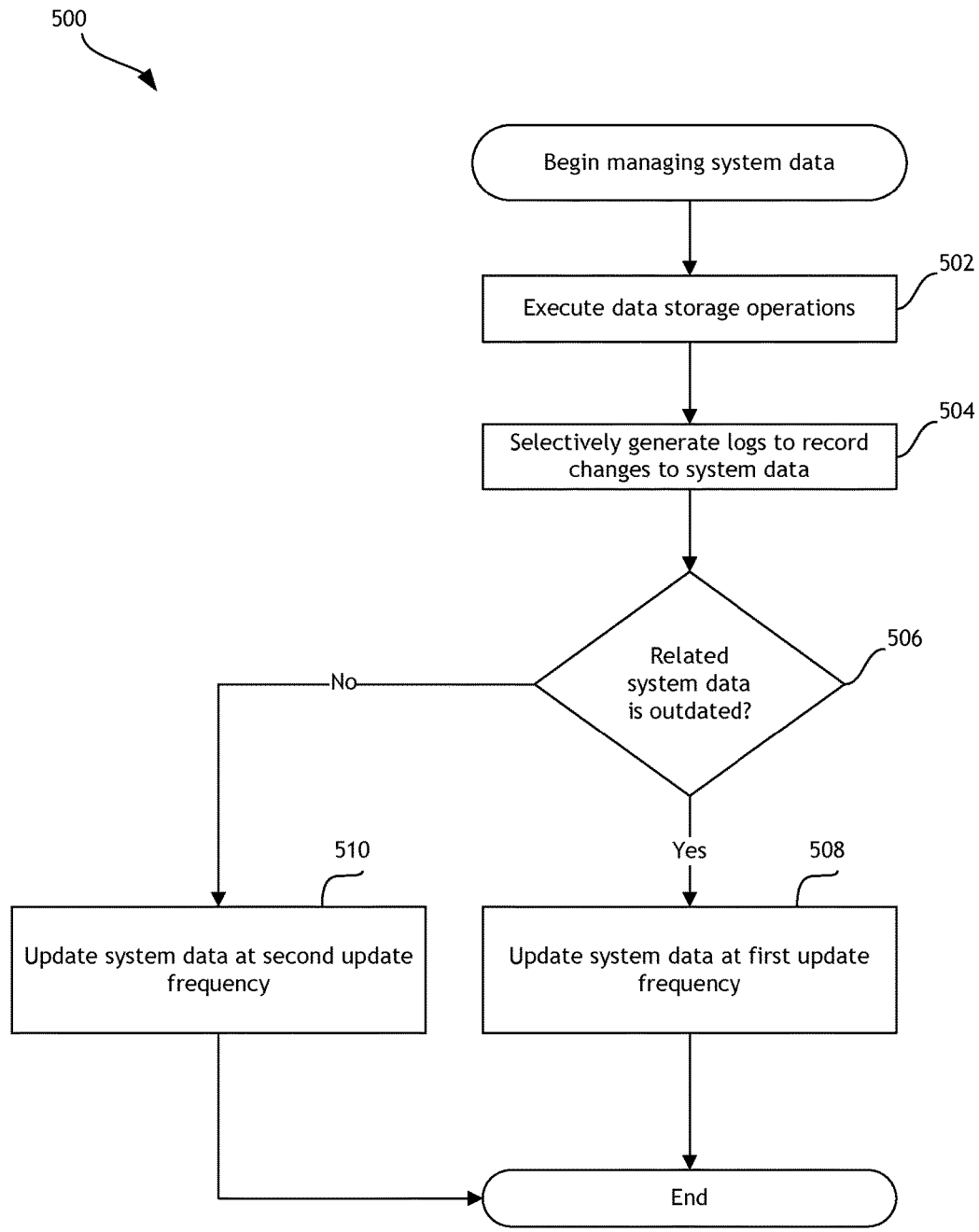
FIG. 5 is a flow diagram illustrating managing system data using garbage collection and logs according to yet another embodiment of the invention.

FIG. 5 is a flow diagram illustrating a process 500 for managing system data using garbage collection and logs according to an embodiment of the invention. The process 500 can be executed by the controller 130 and/or system data manager 132. In block 502, the process 500 can execute storage access operations received from the host system 110 and/or internally generated by the data storage system 120. As is explained above, execution of the storage access operations can cause system data stored in the volatile memory 134 to become outdated or invalid. In block 504, the process 500 can selectively generate logs to record changes to the system data stored in the non-volatile memory array 150. In one embodiment, the process 500 can determine whether storage access operations (due to the host system and/or internally generated) cause related system data stored in the non-volatile memory array 150 to become outdated. In one embodiment, system data related to given system data can correspond to system data that can be updated along with given system data so that performance is improved. For example, related system data can include system data that neighbors and/or surrounds given system data in the non-volatile memory array 150, such as, system data stored in the same or neighboring non-volatile memory pages. This type of related data can be logically related to given system data (e.g., correspond to consecutive logical memory addresses in case when system data comprises a logical to physical address mapping table). As another example, related system data can be system data that is stored so that concurrent updating of related system data and given system data stored in the non-volatile memory array 150 can be performed (e.g., related system data and given system data can be stored in a different superblocks).

In block 506, the process 500 determines whether execution of storage access commands causes related system data to become outdated. If the process 500 determines that execution of storage access commands causes related system data to become outdated, in block 508 the process can update the non-volatile copy of the system data at a first update frequency or rate. In one embodiment, when execution of storage access commands causes related system data to become outdated, consolidated changes are being made to data stored in the data storage system 120. For example, the host system 110 may be storing data sequentially (such as when storing a media file), which causes data stored in consecutive or substantially consecutive logical addresses to be updated. When such consolidated changes are being made, write amplification associated with managing of system data and system performance can be improved when the non-volatile copy of the system data is updated more frequently. For example, fewer logs may be generated in such case.

In one embodiment, generation of logs can be bypassed, such as when the process 500 determines that execution of storage access commands causes related system data to become outdated. In such case, changes to system data are consolidated, and it may be more efficient to update system data in the non-volatile memory array 150 directly without generating logs. This can reduce write amplification (e.g., because no logs are written to the non-volatile memory array). In one embodiment, metadata can be generated and utilized to invalidate earlier generated logs recording changes to system data that is being updated directly. In other words, changes reflected in some log pages become outdated when generation of logs is bypassed and system data is updated directly. For example, metadata can include identification of a most recently generated log page that comprises outdated system data changes. This log page along with all earlier generated log pages recording outdated changes to system data can be invalidated.

If the process 500 determines that execution of storage access commands does not cause related system data to become outdated, in block 510 the process can update the non-volatile copy of the system data at a second update frequency or rate (which can be, for example, lower than the first update frequency). In one embodiment, when execution of storage access commands does not cause related system data to become outdated, scattered or random changes are being made to data stored in the data storage system 120. For example, the host system 110 may be randomly updating stored data (e.g., as part of performing periodic logging), which causes data stored in non-consecutive or substantially non-consecutive logical addresses to be updated. When such scattered changes are being made, write amplification associated with managing of system data and system performance can be improved by waiting and consolidating more changes to the system data (e.g., because changes may correspond to the same system data entry). For example, more log pages can be generated, and the update frequency can be lower than in the consolidated or sequential case. As another example, changes reflected in already generated log pages can be consolidated into new log pages (and already generated log pages can be invalidated). In one embodiment, the update frequency can be the same as or higher than in the consolidated or sequential case.

In one embodiment, the process 500 can perform updates to the non-volatile copy of the system data based on all new logs generated since the last update of system data took place. In another embodiment, the process 500 can commit changes to system data when a certain number of logs have been generated, as is explained above. This number can be a preset number or can be dynamically determined and/or adjusted. Waiting to consolidate updates to system data can reduce write amplification and ensure coherency. For example, the number of updates to the non-volatile copy of the system data can be reduced because logs can comprise multiple changes corresponding to the same system data entry, and only the latest changes can be applied. Further, updating system data after a certain number of logs have been generated can improve reconstruction time of the volatile copy of the system data and reduce start-up time (e.g., because amount of changes to system data is bounded by the number of new logs).

In addition, the process 500 can update system data based on a subset of new logs that have been generated since the last update of system data took place. For example, as described above, the process 500 can update system data based on a number of logs that have been generated first (e.g., since the last update of system data). In other embodiments, the process 500 can select other subsets of logs. After changes recorded in the logs have been applied to system data, the process 500 can perform garbage collection of those logs. Garbage collection can be performed in the manner explained above or any other suitable manner.

Conclusion

To increase the efficiency of managing and storing system data in non-volatile memory and to reduce write amplification and reconstruction time, a data storage system can utilize garbage collection and logs. Write amplification associated with managing and storing system data in the non-volatile memory can be reduced at least in part because changes to the system data can be consolidated and/or because updates to the system data stored in the non-volatile memory can be performed earlier or later depending on host system (or data storage system) activity. Time associated with a reconstruction of the system data can be reduced because the data storage system can set an upper bound on the number of valid new logs reflecting changes to the system data.

Other Variations

Those skilled in the art will appreciate that additional system components can be utilized, and disclosed system components can be combined or omitted. In some embodiments system data can be generated without being stored in the non-volatile memory. In addition, while in some embodiments a table page or log page refers to a quantity of mapping table data that fits into a page of non-volatile memory, other storage arrangements can be utilized. Although logical to physical address mapping table system data example is used throughout this disclosure, approaches disclosed herein are applicable to other types of system data organized as tables or using other suitable data structures. System data can be stored in other non-volatile memory modules, such as magnetic storage. For example, in one embodiment where the data storage system is a shingled magnetic device, which may use address indirection that require maintenance of mapping table data, the system data may be saved in the magnetic storage 160 in the manners described herein. The actual steps taken in the disclosed processes, such as the processes illustrated in FIGS. 3-5, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. In a data storage system comprising a non-volatile memory array and a controller, a method of managing system data, the method comprising:

executing a plurality of storage access commands received from a host system, the plurality of storage access commands being associated with host data, wherein the execution of the plurality of storage access commands causes first system data stored in the non-volatile memory array to become outdated, the first system data being different from the host data;

selectively generating log pages to record changes to the first system data and not the host data, the changes being caused by the execution of the plurality of storage access commands;

storing the log pages in the non-volatile memory array;

determining whether the execution of the plurality of storage access commands causes second system data stored in the non-volatile memory array to become outdated, the first system data and the second system data being stored in the same non-volatile memory pages;

in response to determining that the execution of the plurality of storage access commands causes the second system data to become outdated, updating the first and second system data based on the log pages at a first update frequency so that at least some of the first and second system data becomes current; and in response to determining that the execution of the plurality of storage access commands does not cause the second system data to become outdated, updating the first and second system data based on the log pages at a second update frequency so that at least some of the first and second system data becomes current, wherein the first update frequency is different than the second update frequency, wherein the method reduces write amplification of the non-volatile memory array associated with managing the first and second system data, and wherein the method is performed under the control of the controller.

2. The method of claim 1, wherein one or both of the first and second system data comprises a mapping table that associates a set of logical addresses in the data storage system with a set of physical locations in the non-volatile memory array where the host data is stored.

3. The method of claim 1, wherein selectively generating the log pages comprises:

generating a first set of log pages to record the changes to the first system data caused by the execution of the plurality of storage access commands when it is determined that the execution of the plurality of storage access commands causes the second system data to become outdated; and generating a second set of log pages to record the changes to the first system data caused by the execution of the plurality of storage access commands when it is determined that the execution of the plurality of storage access commands does not cause the second system data to become outdated.

4. The method of claim 3, wherein:

updating the first and second system data comprises, in response to determining that a first number of log pages in the first set of log pages exceeds a first threshold:

updating at least some of the outdated first and second system data based on at least some log pages in the first set, and performing garbage collection of the at least some log pages in the first set after changes reflected in the at least some log pages in the first set are applied to the first and second system data; and updating the first system data comprises, in response to determining that a second number of log pages in the second set of log pages exceeds a second threshold:

updating at least some of the outdated first system data based on at least some log pages in the second set, and performing garbage collection of the at least some log pages in the second set after changes reflected in the at least some log pages in the second set are applied to the first system data, wherein the first number of log pages is greater than the second number of log pages.

5. The method of claim 4, wherein:

updating at least some of the outdated first and second system data based on at least some log pages in the first set comprises updating the at least some of the outdated first and second system data based on a third number of log pages of the first set that were generated before other log pages of the first set; and updating at least some of the outdated first system data based on at least some log pages in the second set comprises updating the at least some of the outdated first system data based on a fourth number of log pages of the second set that were generated before other log pages of the second set, wherein the third number is the same as the fourth number.

6. The method of claim 1, wherein:

execution of the plurality of storage access commands causes the second system data to become outdated when the plurality of storage access commands are directed to consecutive logical addresses in the data storage system; and execution of the plurality of storage access commands does not cause the second system data to become outdated when the plurality of storage access commands are directed to nonconsecutive logical addresses in the data storage system.

7. The method of claim 1, further comprising performing garbage collection of a set of log pages after changes reflected in the set of log pages are applied to at least one of the first or second system data.

8. The method of claim 1, wherein:

no log pages are generated when it is determined that the execution of the plurality of storage access commands causes the second system data to become outdated; and the first update frequency is greater than the second update frequency.

9. The method of claim 1, further comprising consolidating the changes recorded in the log pages into at least one new log page and updating at least one of the first or second system data based on the at least one new log page.

10. The method of claim 1, wherein the log pages are interleaved with memory pages storing the first system data.

11. The method of claim 1, wherein the first system data and the second system data correspond to consecutive logical memory addresses.

12. The method of claim 1, further comprising, in response to determining that execution of one or more storage access commands causes the second system data to become outdated:

updating a portion of at least one of the first or second system data stored in the non-volatile memory array without utilizing any log pages; and generating metadata utilized to invalidate one or more log pages that comprise outdated changes associated with the portion of at least one of the first or second system data.

13. A data storage system comprising:

a non-volatile memory array configured to store host data and system data; and a controller configured to:

execute a plurality of storage access commands received from a host system, the plurality of storage access commands being associated with host data, wherein the execution of the plurality of storage access commands causes first system data stored in the non-volatile memory array to become outdated, the first system data being different from the host data;

selectively generate log pages to record changes to the first system data and not the host data, the changes being caused by the execution of the plurality of storage access commands;
store the log pages in the non-volatile memory array;
determine whether the execution of the plurality of storage access commands causes second system data stored in the non-volatile memory array to become outdated, the first system data and the second system data being stored in the same non-volatile memory pages;
in response to determining that the execution of the plurality of storage access commands causes the second system data to become outdated, update the first and second system data based on the log pages at a first update frequency so that at least some of the first and second system data becomes current; and
in response to determining that the execution of the plurality of storage access commands does not cause the second system data to become outdated, update the first and second system data based on the log pages at a second update frequency so that at least some of the first and second system data becomes current, wherein the first update frequency is different than the second update frequency.

14. The data storage system of claim 13, wherein one or both of the first and second system data comprises a mapping table that associates a set of logical addresses in the data storage system with a set of physical locations in the non-volatile memory array where the host data is stored.

15. The data storage system of claim 13, wherein the controller is configured to selectively generate log pages by:
generating a first set of log pages to record the changes to the first system data caused by the execution of the plurality of storage access commands when it is determined that the execution of the plurality of storage access commands causes the second system data to become outdated; and
generating a second set of log pages to record the changes to the first system data caused by the execution of the plurality of storage access commands when it is determined that the execution of the plurality of storage access commands does not cause the second system data to become outdated.

16. The data storage system of claim 15, wherein the controller is configured to:
update the first and second system data by, in response to determining that a first number of log pages in the first set of log pages exceeds a first threshold:
updating at least some of the outdated first and second system data based on at least some log pages in the first set, and
performing garbage collection of the at least some log pages in the first set after changes reflected in the at least some log pages in the first set are applied to the first and second system data; and
update the first system data by, in response to determining that a second number of log pages in the second set of log pages exceeds a second threshold:
updating at least some of the outdated first system data based on at least some log pages in the second set, and
performing garbage collection of the at least some log pages in the second set after changes reflected in the at least some log pages in the second set are applied to the first system data, wherein the first number of log pages is greater than the second number of log pages.

17. The data storage system of claim 16, wherein the controller is configured to:
update at least some of the outdated first and second system data based on at least some log pages in the first set by updating the at least some of the outdated first and second system data based on a third number of log pages of the first set that were generated before other log pages of the first set; and
update at least some of the outdated first system data based on at least some log pages in the second set by updating the at least some of the outdated first system data based on a fourth number of log pages of the second set that were generated before other log pages of the second set, wherein the third number is same as the fourth number.

18. The data storage system of claim 13, wherein:
execution of the plurality of storage access commands causes the second system data to become outdated when the plurality of storage access commands are directed to consecutive logical addresses in the data storage system; and
execution of the plurality of storage access commands does not cause the second system data to become outdated when the plurality of storage access commands are directed to nonconsecutive logical addresses in the data storage system.

19. The data storage system of claim 13, wherein the controller is further configured to perform a garbage collection of a set of log pages after changes reflected in the set of log pages are applied to at least one of the first or second system data.

20. The data storage system of claim 13, wherein:
the controller is configured not to generate log pages when the controller determines that the execution of the plurality of storage access commands causes the second system data to become outdated; and
the first update frequency is greater than the second update frequency.

21. The data storage system of claim 13, wherein the log pages are interleaved with memory pages storing the first system data.

22. In a data storage system comprising a non-volatile memory array and a controller, a method of managing system data, the method comprising:
executing a plurality of storage access commands received from a host system, the plurality of storage access commands being associated with host data, wherein the execution of the plurality of storage access commands causes first system data stored in the non-volatile memory array to become outdated, the first system data being different from the host data;
generating log pages to record changes to the first system data and not the host data, the changes being caused by the execution of the plurality of storage access commands;
storing the log pages in the non-volatile memory array;
in response to determining that a number of generated log pages exceeds a first threshold:
determining whether the execution of the plurality of storage access commands causes second system data stored in the non-volatile memory array to become outdated, the first system data and the second system data being stored in the same non-volatile memory pages;
updating the first system data and the second system data stored in the non-volatile memory array based on a set of generated log pages at an update frequency, the update frequency being based on whether the execution of the plurality of storage access commands causes the second system data stored in the non-volatile memory array to become outdated; and performing garbage collection of the set of generated log pages after changes reflected in the log pages of the set are applied to the at least one of the first system data or the second system data, wherein the method reduces write amplification of the non-volatile memory array associated with managing the first system data and the second system data, and wherein the method is performed under the control of the controller.

23. The method of claim 22, wherein log pages in the set of generated log pages comprise log pages that were generated before other generated log pages and the number of log pages in the set equals to a second threshold.

24. The method of claim 22, wherein the first system data comprises a mapping table that associates a set of logical addresses in the data storage system with a set of physical locations in the non-volatile memory array where the host data is stored.

25. The method of claim 22, wherein the log pages are interleaved with memory pages storing the first system data.

26. In a data storage system comprising a non-volatile memory array and a controller, a method of managing system data, the method comprising:

executing a plurality of storage access commands received from a host system, the plurality of storage access commands being associated with host data, wherein the execution of the plurality of storage access commands comprising the host data causes first system data stored in the non-volatile memory array to become outdated, the first system data being different from the host data;

generating a log page to record changes to the first system data and not the host data, the changes being caused by the execution of the plurality of storage access commands;

storing the log page in the non-volatile memory array;

determining whether the execution of the plurality of storage access commands causes second system data stored in the non-volatile memory array to become outdated, the first system data and the second system data being stored in the same non-volatile memory pages;

updating the first system data and the second system data stored in the non-volatile memory array based at least on the log page at an update frequency, the update frequency being based on whether the execution of the plurality of storage access commands causes the second system data stored in the non-volatile memory array to become outdated; and performing garbage collection of the log page after the changes reflected in the log page are applied to the at least one of the first system data or the second system data, wherein the method reduces write amplification of the non-volatile memory array associated with managing the first system data and second system data, and wherein the method is performed under the control of the controller.

27. The method of claim 26, wherein the first system data comprises a mapping table that associates a set of logical addresses in the data storage system with a set of physical locations in the non-volatile memory array where the host data is stored.

28. The method of claim 26, wherein the log page is interposed between memory pages storing the first system data.

* * * * *